US009865868B2

(12) United States Patent
Watanabe

(10) Patent No.: US 9,865,868 B2
(45) Date of Patent: Jan. 9, 2018

(54) NEGATIVE ELECTRODE MATERIAL FOR USE IN NON-AQUEOUS ELECTROLYTE SECONDARY BATTERY, METHOD OF PRODUCING THE SAME, AND LITHIUM-ION SECONDARY BATTERY

(71) Applicant: SHIN-ETSU CHEMICAL CO., LTD., Tokyo (JP)

(72) Inventor: Koichiro Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 28 days.

(21) Appl. No.: 14/781,170

(22) PCT Filed: Apr. 11, 2014

(86) PCT No.: PCT/JP2014/002081
§ 371 (c)(1),
(2) Date: Sep. 29, 2015

(87) PCT Pub. No.: WO2014/185005
PCT Pub. Date: Nov. 20, 2014

(65) Prior Publication Data
US 2016/0190554 A1 Jun. 30, 2016

(30) Foreign Application Priority Data

May 15, 2013 (JP) .................................. 2013-103145

(51) Int. Cl.
*H01M 4/36* (2006.01)
*H01M 4/48* (2010.01)
(Continued)

(52) U.S. Cl.
CPC .......... *H01M 4/366* (2013.01); *H01M 4/386* (2013.01); *H01M 4/483* (2013.01); *H01M 4/625* (2013.01);
(Continued)

(58) Field of Classification Search
CPC .......... H01M 4/36; H01M 4/366; H01M 4/38; H01M 4/386; H01M 4/48; H01M 4/483; H01M 4/62; H01M 4/625; H01M 10/0525
See application file for complete search history.

(56) References Cited

U.S. PATENT DOCUMENTS 5,395,711 A    3/1995   Tahara et al.
5,478,671 A    12/1995   Idota
(Continued)

FOREIGN PATENT DOCUMENTS

CN    102054983 A    5/2011
EP    2 104 175 A2    9/2009
(Continued)

OTHER PUBLICATIONS

Oct. 6, 2016 Extended Search Report issued in European Patent Application No. 14798450.4.
(Continued)

*Primary Examiner* — Karie O'Neill Apicella
(74) *Attorney, Agent, or Firm* — Oliff PLC

(57) ABSTRACT

A method of producing a negative electrode material for use in a non-aqueous electrolyte secondary battery, including: making base powder containing silicon; measuring a volume average particle diameter of this powder by particle size distribution with laser diffractometry; randomly sampling 5000 particles or more from the powder and measuring their roundness; selecting the powder if the volume average particle diameter ranges from 0.5 to 20 μm, the roundness of the sampled particles is 0.93 or more on average, and a ratio of the number of particles having a roundness of 0.85 or less is 5% or less; and coating the selected powder with carbon. A negative electrode material useful for a non-aqueous electrolyte secondary battery that has excellent cycle performance and makes the best use of advantages of a silicon-
(Continued)

contained material, a method of producing this negative electrode material, and a lithium-ion secondary battery.

6 Claims, 1 Drawing Sheet

(51) Int. Cl.
 *H01M 10/0525* (2010.01)
 *H01M 4/38* (2006.01)
 *H01M 4/62* (2006.01)
 *H01M 4/587* (2010.01)
 *H01M 4/02* (2006.01)

(52) U.S. Cl.
 CPC ........ *H01M 10/0525* (2013.01); *H01M 4/362* (2013.01); *H01M 4/587* (2013.01); *H01M 2004/027* (2013.01); *H01M 2220/30* (2013.01)

(56) References Cited

U.S. PATENT DOCUMENTS

| | | | |
|---|---|---|---|
| 6,066,414 | A | 5/2000 | Imoto et al. |
| 6,383,686 | B1 | 5/2002 | Umeno et al. |
| 2003/0129494 | A1 | 7/2003 | Kaneda et al. |
| 2006/0147797 | A1 | 7/2006 | Wu et al. |
| 2010/0124707 | A1 | 5/2010 | Hirose et al. |
| 2011/0097627 | A1* | 4/2011 | Watanabe .............. B82Y 30/00 429/206 |
| 2013/0260245 | A1 | 10/2013 | Kitagawa et al. |
| 2013/0302675 | A1 | 11/2013 | Kouzu et al. |
| 2014/0023928 | A1* | 1/2014 | Jeon ..................... H01M 4/364 429/220 |

FOREIGN PATENT DOCUMENTS

| | | |
|---|---|---|
| JP | H05-174818 A | 7/1993 |
| JP | H06-60867 A | 3/1994 |
| JP | H10-294112 A | 11/1998 |
| JP | H11-102705 A | 4/1999 |
| JP | 2997741 B2 | 1/2000 |
| JP | 2000-215887 A | 8/2000 |
| JP | 2000-243396 A | 9/2000 |
| JP | 2002-042806 A | 2/2002 |
| JP | 2006-190642 A | 7/2006 |
| JP | 2010-140885 A | 6/2010 |
| JP | 2011-090947 A | 5/2011 |
| JP | 2011-096455 A | 5/2011 |
| JP | 2012-124121 A | 6/2012 |
| JP | 2013-008585 A | 1/2013 |
| JP | 2013-038072 A | 2/2013 |
| JP | 2013-069565 A | 4/2013 |

OTHER PUBLICATIONS

Nov. 17, 2015 International Preliminary Report on Patentability issued in International Patent Application No. PCT/JP2014/002081.
May 13, 2014 Search Report issued in International Patent Application No. PCT/JP2014/002081.
Jun. 7, 2016 Office Action issued in Japanese Patent Application No. 2013-103145.
Jan. 11, 2017 Office Action issued in Chinese Patent Application No. 201480027925.3.

* cited by examiner

NEGATIVE ELECTRODE MATERIAL FOR USE IN NON-AQUEOUS ELECTROLYTE SECONDARY BATTERY, METHOD OF PRODUCING THE SAME, AND LITHIUM-ION SECONDARY BATTERY

TECHNICAL FIELD

The present invention relates to a negative electrode material for use in a non-aqueous electrolyte secondary battery, a method of producing the same, and a lithium-ion secondary battery.

BACKGROUND ART

As mobile devices such as mobile electronic devices and mobile communication devices have highly developed, secondary batteries with higher energy density are recently needed to improve efficiency and reduce the size and weight of the devices.

The capacity of the secondary batteries of this type can be improved by known methods: use of a negative electrode material made of an oxide of V, Si, B, Zr or Sn, or a complex oxide thereof (See Patent Literatures 1 and 2, for example); use of a negative electrode material made of a metallic oxide subjected to melting and rapid cooling (See Patent Literature 3, for example); use of a negative electrode material made of a silicon oxide (See Patent Literature 4 for example); use of a negative electrode material made of $Si_2N_2O$ and $Ge_2N_2O$ (See Patent Literature 5 for example), and others.

The negative electrode materials can be made conductive by known methods: performing mechanical alloying of SiO and graphite, and carbonizing the resultant (See Patent Literature 6, for example); coating silicon particles with carbon layers by chemical vapor deposition (See Patent Literature 7, for example); coating silicon oxide particles with carbon layers by chemical vapor deposition (See Patent Literature 8, for example).

Although these conventional methods increase the charging and discharging capacities and energy density to some extent, the increase is insufficient for market needs and the cycle performance fails to fulfill the needs. The conventional methods need to further improve the energy density and thus are not entirely satisfactory.

Patent Literature 4 discloses use of a silicon oxide as a negative electrode material for a lithium-ion secondary battery so as to obtain an electrode with a high capacity. To the present inventor's knowledge, however, this method cannot achieve low irreversible capacity at first charging and discharging and a practical level of cycle performance; this method can be improved on to solve these problems.

The methods to provide a negative electrode material with conductivity remain the following problems. The method in Patent Literature 6 uses solid-state welding and thus cannot uniformly form a carbon coating, resulting in insufficient conductivity.

Although the method in Patent Literature 7 enables the formation of a uniform carbon coating, this method uses Si as a negative electrode material and thus reduces the cycle performance because the expansion and contraction of the material becomes too large at lithium insertion or extraction. This makes the material unsuited to practical use. The charging capacity consequently needs to be limited to avoid this problem.

Although the method in Patent Literature 8 enables the improvement in cycle performance, the precipitation of silicon fine crystals, the structure of a carbon coating and the combination between the carbon coating and the base are unsatisfactory. Thus, the material produced by this method is unpractical for use in secondary batteries. This material causes the batteries to gradually reduce the capacity with an increase in charging and discharging cycles and to greatly reduce the capacity after given cycles.

CITATION LIST

Patent Literature

Patent Literature 1: Japanese Unexamined Patent publication (Kokai) No. H05-174818
Patent Literature 2: Japanese Unexamined Patent publication (Kokai) No. H06-60867
Patent Literature 3: Japanese Unexamined Patent publication (Kokai) No. H10-294112
Patent Literature 4: Japanese Patent No. 2997741
Patent Literature 5: Japanese Unexamined Patent publication (Kokai) No. H11-102705
Patent Literature 6: Japanese Unexamined Patent publication (Kokai) No. 2000-243396
Patent Literature 7: Japanese Unexamined Patent publication (Kokai) No. 2000-215887
Patent Literature 8: Japanese Unexamined Patent publication (Kokai) No. 2002-42806

SUMMARY OF INVENTION

Technical Problem

It is an object of the present invention to provide a negative electrode material useful for a non-aqueous electrolyte secondary battery that has excellent cycle performance and makes the best use of advantages of a silicon-contained material such as a high capacity, a method of producing this negative electrode material, and a lithium-ion secondary battery including this negative electrode material.

Solution to Problem

To solve this object, the present invention provides a method of producing a negative electrode material for use in a non-aqueous electrolyte secondary battery, comprising: making base powder out of a silicon-contained material capable of occluding and emitting lithium ions; measuring a volume average particle diameter of the made base powder by using particle size distribution with laser diffractometry; randomly sampling 5000 particles or more from the base powder and measuring roundness of the sampled particles by image analysis of the particles, the roundness being defined by (a perimeter of a circle having the same projected area)/(a perimeter of the particle); selecting the base powder if the volume average particle diameter ranges from 0.5 to 20 μm, the roundness of the sampled particles is 0.93 or more on average, and a ratio of the number of particles having a roundness of 0.85 or less among the sampled particles is 5% or less; and coating a surface of the selected base powder with a carbon coating.

Such a producing method can coat the surface of the base powder with carbon more uniformly compared with conventional methods and inhibit the particles from breaking and cracking due to repetition of their expansion and contraction, thereby enabling production of a negative electrode material for use in a non-aqueous electrolyte secondary battery having excellent cycle performance.

The base powder is preferably selected from the group consisting of silicon powder, particles with composite structure in which silicon fine particles are dispersed into a silicon compound, silicon oxide powder expressed by a general formula of $SiO_x$, and a mixture of two or more thereof.

Use of this base powder allows for improvements in first charge and discharge efficiency, capacity, and cycle performance.

The method preferably includes coating a metallic oxide coating on the surface of the selected base powder after selecting the base powder, wherein the carbon coating is coated on a surface of the metallic oxide coating.

The configuration of the metallic oxide coating on the surface of the selected base powder and the carbon coating on the surface of the metallic oxide coating reduce an activity of the surface of the negative electrode material and inhibit decomposition of an electrolyte, thereby achieving a reduction in the amount of gas to be generated and further improvements in cycle performance.

Furthermore, the present invention provides a negative electrode material for use in a non-aqueous electrolyte secondary battery, comprising: base powder made of a silicon-contained material capable of occluding and emitting lithium ions; and a carbon coating with which a surface of the base powder is coated, wherein a volume average particle diameter of the base powder that is measured by using particle size distribution with laser diffractometry ranges from 0.5 to 20 μm, roundness of 5000 particles or more that are randomly sampled from the base powder is 0.93 or more on average, the roundness being measured by image analysis of the particles and defined by (a perimeter of a circle having the same projected area)/(a perimeter of the particle), and a ratio of the number of particles having a roundness of 0.85 or less among the sampled particles is 5% or less.

Such a negative electrode material is used for a non-aqueous electrolyte secondary battery having excellent cycle performance, because the surface of the base powder is coated with carbon more uniformly compared with conventional methods and the particles can be inhibited from breaking and cracking due to repetition of their expansion and contraction.

The base powder is preferably selected from the group consisting of silicon powder, particles with composite structure in which silicon fine particles are dispersed into a silicon compound, silicon oxide powder expressed by a general formula of $SiO_x$, and a mixture of two or more thereof.

Use of this base powder allows for improvements in first charge and discharge efficiency, capacity, and cycle performance.

In the negative electrode material for use in a non-aqueous electrolyte secondary battery, a metallic oxide coating is preferably coated on the surface of the base powder and the carbon coating is preferably coated on a surface of the metallic oxide coating whereby the carbon coating coats the surface of the base powder.

The base powder coated with the carbon coating configured such that the metallic oxide coating is coated on the surface of the base powder and the carbon coating is coated on the surface of the metallic oxide coating reduces an activity of the surface of the negative electrode material and inhibit decomposition of an electrolyte, thereby achieving a reduction in the amount of gas to be generated and further improvements in cycle performance.

Furthermore, the present invention provides a lithium-ion secondary battery comprising a positive electrode, a negative electrode, and a lithium-ion conducting non-aqueous electrolyte, wherein a negative electrode material according to the invention is used for the negative electrode.

The inventive negative electrode material for use in a non-aqueous electrolyte secondary battery exhibits good battery characteristics (first efficiency and cycle performance) when used for a negative electrode of the non-aqueous electrolyte secondary battery, as described above. The lithium-ion secondary battery using the inventive negative electrode material for use in a non-aqueous electrolyte secondary battery thus has excellent battery characteristics, particularly excellent cycle performance.

Advantageous Effects of Invention

Use of the inventive negative electrode material as a negative electrode material of a non-aqueous electrolyte secondary battery allows the non-aqueous electrolyte secondary battery to have a high first charge and discharge efficiency, a high capacity, and excellent cycle performance. This negative electrode material is particularly suitable for a lithium-ion secondary battery. In addition, the method of producing this negative electrode material for use in a non-aqueous electrolyte secondary battery is not particularly complicated but easy to perform; this method is applicable to industrial scale production.

DESCRIPTION OF EMBODIMENTS

Figure 1:
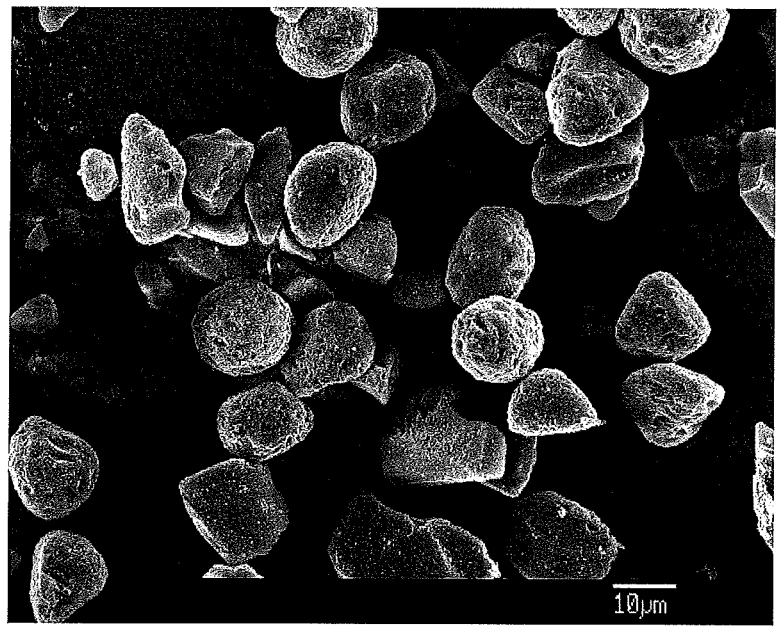
FIG. 1 is a picture of base powder in example 2 by a scanning electron microscope (SEM)

The present invention will hereinafter be more specifically described.

It is expected to develop a negative electrode material useful for a non-aqueous electrolyte secondary battery that maintains advantages of a silicon-contained material such as a silicon oxide material having a high battery capacity and a low volume expansion rate and has excellent cycle performance and a method of producing this material, as described previously.

Exemplary powder made of a silicon-contained material capable of occluding and emitting lithium ions is silicon oxide. Silicon oxide can be expressed by $SiO_x$. According to X-ray diffraction analysis, nano-silicon having a size from several nanometers to several tens of nanometers is fine-dispersed into silicon oxide.

Accordingly, silicon oxide is thought to be readily used as a negative electrode active material, because silicon oxide has a battery capacity five or six times larger per mass than carbon and a low volume expansion rate, although this battery capacity is smaller than that of silicon.

It is however necessary to give silicon oxide conductivity to make conductive powder in any manner because silicon oxide is an insulator.

To give conductivity, there are the following methods: mixing silicon oxide with conductive particles such as graphite, coating a surface of the composite particles with carbon, and a combination of these, as described previously.

A preferred method of coating with carbon is to perform chemical vapor deposition (CVD) on the composite particles under an organic gas and/or vapor. This method can be efficiently performed by introducing the organic gas and/or vapor into a reactor during a heat treatment.

The present inventors took various considerations to improve the conductivity of base powder, and found that coating a surface of a material capable of occluding and emitting lithium ions with carbon enables significant improvement in battery characteristics. However, the inventors also found that mere carbon coating fails to meet requirements of these characteristics in the market.

The inventors considered in detail to further improve the characteristics, and found that the material capable of occluding and emitting lithium ions can achieve the level of characteristics required in the market by restricting the shape of this material within a given range.

More specifically, the conductivity is affected by not only the amount of the carbon coating but also the uniformity of the coating. The inventors thus found the uniformity is important, and also that there is a need for a measure to prevent failure in the combination between the base and the coating due to their expansion and contraction upon charging and discharging.

A base with a scaly or acute form may adversely affect the cycle performance, even when this base is well combined with the carbon coating at the time of production of a negative electrode material.

The inventors also found that if the base powder has an edge, then the thickness of the carbon coating inevitably becomes thinner at this portion, and this base powder is easy to expose its surface.

Even through a prescribed amount of carbon is formed, a partially exposed surface of the base powder (such as silicon oxide) due to nonuniform coating is insulated, consequently adversely affecting charging and discharging capacities and cycle performance. If the roundness of each particle is made uniform so as to be a prescribed value or more on average, then acute particles are reduced and the uniformity of the thickness of the carbon coating is thereby improved. In addition to this, break and crack of particles due to their expansion and contraction can be inhibited. This prevents creation of a new contact surface with an electrolyte, thereby inhibiting the occurrence of decomposition reaction of the electrolyte, which is a factor in reduction in the cycle performance.

This roundness is defined by the expression of (a perimeter of a circle having the same projected area)/(a perimeter of the particle). The average of the roundness is obtained from measurements of 5,000 particles, preferably 10,000 particles. The roundness can readily be measured with an apparatus for analyzing a particle image such as FPIA-3000 made by Malvern Instruments Ltd.

The silicon-contained materials capable of occluding and emitting lithium ions were obtained under various conditions to evaluate the battery characteristics after the surface of these materials were coated with carbon. It was confirmed from this evaluation that the characteristics differ depending on the shape of the base powder (particles to form the base).

The inventors then found from the analysis of the obtained materials that when average roundness of the particles to be the base falls within a specified range, this material can be used as a negative electrode material for use in a non-aqueous electrolyte secondary battery having good battery characteristics, thereby brought the invention to completion.

The invention will now be described in detail but not limited thereto.

The inventive negative electrode material for use in a non-aqueous electrolyte secondary battery includes base powder made of a silicon-contained material capable of occluding and emitting lithium ions; and a carbon coating with which a surface of the base powder is coated. The volume average particle diameter of this base powder ranges from 0.5 to 20 μm. This volume average particle diameter is measured by using particle size distribution with laser diffractometry.

The roundness of 5000 particles or more that are randomly sampled from the base powder is 0.93 or more on average; this roundness is measured by image analysis of the particles. The ratio of the number of particles having a roundness of 0.85 or less among the sampled particles is 5% or less.

The roundness can readily be measured with an apparatus for analyzing a particle image such as FPIA-3000 made by Malvern Instruments Ltd, as described above.

The measurement number of the particles needs to be 5,000 or more, preferably 10,000 or more, to determine whether the roundness of the particles is 0.93 or more on average. The upper limit of this measurement number of the particles is not particularly limited; for example, the upper limit is preferably a million or less.

When the ratio of the number of particles having a roundness of 0.85 or less is 5% or less, preferably 3% or less, the roundness of the whole powder can be regarded as being high. If the ratio of the number of particles of acute base powder that have a roundness of 0.85 or less is more than 5%, then this base powder may degrade the cycle performance when being used as a negative electrode material.

The base powder can be selected from the group consisting of silicon powder, particles with composite structure in which silicon fine particles are dispersed into a silicon compound, silicon oxide powder expressed by a general formula of $SiO_x$, and a mixture of two or more thereof. Note that the range of x in $SiO_x$ is preferably $0.5 \leq x \leq 1.6$.

Use of this base powder enables improvement in first charge and discharge efficiency, capacity, and cycle performance.

The base powder can be conductive powder having a metallic oxide coating on the surface of the base powder and the carbon coating on the surface of the metallic oxide coating.

A negative electrode material having the metallic oxide coating on the surface of the base powder reduces its surface activity by this metallic oxide coating, thereby inhibiting the decomposition of an electrolyte. The amount of gas to be generated can thereby be reduced, and the cycle performance can be improved. This negative electrode material is used for a safe non-aqueous electrolyte secondary battery having a high capacity, because this material more effectively inhibits igniting and breaking of the battery compared with conventional materials.

The metallic oxide coating can be made of an oxide of one or more elements selected from the group consisting of magnesium, aluminum, titanium, and silicon. Besides the these elements, the metallic oxide coating can contain at least one element selected from the group consisting of zirconium, hafnium, vanadium, niobium, tantalum, chromium, molybdenum, tungsten, manganese, iron, ruthenium, cobalt, rhodium, iridium, nickel, palladium, cerium, indium, germanium, tin, bismuth, antimony, cadmium, copper, and silver.

The metallic oxide coating can be coated at a mass ratio ranging from 0.1 mass % to 30 mass % with respect to the silicon oxide particles.

When the coverage of the metallic oxide coating is 0.1 mass % or more with respect to the silicon oxide particles, the thickness of the coating is sufficiently thick and uniform. Such a negative electrode material for use in a non-aqueous electrolyte secondary battery increases the safety of an electrolyte. When this coverage is 30 mass % or less, the ratio of the metallic oxide, which is an inactive material, is prevented from becoming too large; this inhibits reduction in the battery capacity of the negative electrode material.

A negative electrode material according to the invention that has the carbon coating disposed on the surface of the metallic oxide disposed on the surface of the base powder can be used for a non-aqueous electrolyte secondary battery having excellent cycle performance, because this material can inhibit the decomposition of an electrolyte at the surface of the particles and this base powder is conductive powder with good surface conductivity.

A method that can produce the negative electrode material of this type will now be described in detail, but the invention is not limited to this method.

[Step (a)]

The method begins with making base powder out of a silicon-contained material capable of occluding and emitting lithium ions (Step (a)).

The base powder made in the step (a) may be silicon powder, particles with composite structure in which silicon fine particles are dispersed into a silicon compound, silicon oxide powder expressed by a general formula of $SiO_x$ (where $0.5 \leq x \leq 1.6$), or a mixture of two or more thereof.

Use of this base powder enables improvements in first charge and discharge efficiency, capacity, and cycle performance.

The particles with a structure in which silicon fine particles (silicon nanoparticles) are dispersed into a silicon compound (such as silicon oxide) can be used as the base powder and obtained by, for example, the following method: sintering a mixture of silicon fine particles and a silicon compound; or performing a heat treatment on silicon oxide particles, expressed by a general formula of $SiO_x$, before disproportionation under an inert and non-oxidizing atmosphere such as an argon atmosphere at 400° C. or more, preferably 800° C. to 1100° C. to cause a disproportionation reaction. A material obtained particularly by the latter method includes silicon fine particles (silicon fine crystals) uniformly dispersed and is thus preferable. This disproportionation reaction enables the silicon fine particles to have a size of 1 nm to 100 nm.

Note that the silicon compound (such as silicon oxide) in the particles, which have the above structure in which the silicon fine particles are dispersed into the silicon compound, is preferably a silicon dioxide. A transmission electron microscope can observe these silicon fine particles (silicon nanoparticles or crystals) dispersed into an amorphous silicon oxide.

The term "silicon oxide" in the invention is a general term for an amorphous silicon oxide; a silicon oxide before disproportionation is expressed by a general formula of $SiO_x$ where $0.5 \leq x \leq 1.6$. This silicon oxide can be obtained by heating a mixture of silicon dioxide and metallic silicon to produce a silicon monoxide gas and cooling and precipitating the silicon monoxide gas.

[Step (b)]

The volume average particle diameter of the base powder made in the step (a) is then measured by using particle size distribution with laser diffractometry (Step (b)).

[Step (c)]

Next, 5000 particles or more are randomly sampled from the base powder made in the step (a). The roundness, defined by (a perimeter of a circle having the same projected area)/(a perimeter of the particle), of the sampled particles is measured by image analysis of the particles (Step (c)). The roundness is measured with an apparatus for analyzing a particle image such as FPIA-3000 made by Malvern Instruments Ltd, as described previously. The order of the steps (b) and (c) is not particularly limited. The upper limit of this measurement number of particles is not particularly limited; for example, the upper limit is preferably a million or less.

[Step (d)]

If the measured volume average particle diameter ranges from 0.5 to 20 μm, the roundness of the sampled particles is 0.93 or more on average, and the ratio of the number of particles having a roundness of 0.85 or less among the sampled particles is 5% or less, then this base powder is selected (Step (d)). The base powder is selected in this way. The following method of producing base powder, for example, is easy to achieve these requirements.

Well-known pulverizer and classifier are used to achieve the target particle diameter. Examples of pulverizer to be used include a ball mill and a media agitating mill, which move grinding media such as balls or beads and pulverize an object by using impact forces, friction forces or compression forces generated by the kinetic energy; a roller mill, which pulverizes an object by using compression forces generated by rollers; a jet mill, which causes an object to collide against an inner wall or against part of the broken object at a high speed and pulverizes the object by impact forces generated by the collision; a hammer mill, pin mill and disc mill, which pulverize an object by using impact forces generated by rotation of a rotor with hammers, blades or pins attached thereto; "a cyclone mill", which performs pulverization by rotating a propeller called an impeller at a high speed to generate an air current. Either wet or dry pulverizing may be employed. The pulverizing is followed by dry, wet or sieve classifying in order to make particle size distribution uniform. The dry classifying mainly uses a gas stream and is performed by successive or simultaneous processes of dispersion, separation (separation between fine and coarse particles), collection (separation between solid and gas), and discharge. Before the classifying, a pretreatment such as adjustment of water content, dispersiveness, humidity, or other conditions may be performed, or the moisture content or oxygen concentration of the gas stream to be used may be adjusted. Performing either this pretreatment or this adjustment allows the prevention of reduction in classifying efficiency due to interference between particles, particle shape, turbulence of the gas stream, velocity distribution, electrostatic charges, or other causes.

An integrated type of dry pulverizer and classifier can conduct pulverizing and classifying operations at once to achieve desired particle size distribution.

In particular, the pulverization by a counter type of jet mill using an air current and the cyclone mill can readily obtain particles with high roundness.

Even if an object pulverized by the pulverizing method has low roundness, the roundness can be improved by treating this object with a surface modification apparatus. Examples of this surface modification apparatus include "Nobilta" made by HOSOKAWA MICRON CORPORATION, or "Hybridization System" made by NARA MACHINERY Co., Ltd.

The BET specific surface area of the base powder to be used is preferably 0.5 to 100 $m^2/g$, more preferably 1 to 20 $m^2/g$.

A BET specific surface area of 0.5 $m^2/g$ or more prevents reduction in battery characteristics due to decrease in adherence when the material is applied to an electrode; a BET specific surface area of 100 $m^2/g$ or less prevents reduction in battery capacity due to a large ratio of silicon dioxide on the particle surface when the negative electrode material is used for a lithium-ion second battery.

[Step (e)]

The surface of the base powder selected in the step (d) is then coated with a carbon coating (Step (e)). This step (e) can be performed simultaneously with a heat treatment on the base powder. For example, a heat treatment for the disproportionation of silicon oxide can be performed.

The base powder coated with the carbon coating can be constituted of the metallic oxide coating on its surface and the carbon coating on the surface of the metallic oxide coating.

In this case, a metallic alkoxide solution is prepared to suspend the base powder. Water is then added to hydrolyze this metallic alkoxide so that the metallic oxide coating is coated. This metallic oxide coating needs to be unable to impair the function of a secondary battery.

Its composition is not particularly limited, provided the coating is unable to impair the function of a secondary battery, and may be an oxide of one or more elements selected from the group consisting of magnesium, aluminum, titanium, and silicon. These oxides of the elements may be used as a single oxide or a complex oxide.

This coating can contain at least one element selected from the group consisting of zirconium, hafnium, vanadium, niobium, tantalum, chromium, molybdenum, tungsten, manganese, iron, ruthenium, cobalt, rhodium, iridium, nickel, palladium, cerium, indium, germanium, tin, bismuth, antimony, cadmium, copper, and silver.

The metallic oxide coating made of such elements can inhibit the decomposition of the electrolyte during charging and discharging, enabling the achievement of the inhibition of both the degradation of the cycle performance and the amount of gas to be generated. This results in reduction in the risk of the expansion and explosion of a battery.

The ratio of the metallic oxide on the surface can be in the range from 0.1 mass % to 30 mass %, preferably in the range from 1 mass % to 20 mass %, more preferably in the range from 1 mass % to 10 mass %, with respect to the particles with the structure in which silicon fine particles are dispersed into the silicon oxide.

When this ratio is 0.1 mass % or more, the risk of safety problems due to coating with a thinner and nonuniform thickness can further be reduced. When this ratio is 30 mass % or less, disadvantages for a battery having a high capacity due to a larger ratio of inactive materials and a reduction in battery capacity can be prevented.

Chemical vapor deposition of carbon is then performed to form the carbon coating on the base powder (or the powder obtained by coating the surface of the base powder with the metallic oxide coating) at temperatures from 600° C. to 1300° C. under an organic gas and/or vapor atmosphere.

In the invention, particles with few acute angle, i.e., particles having the above defined roundness are selectively used as the base powder so that the surface of the powder can be more uniformly coated with carbon. The uniformity of the carbon coating can be compared, for example, by a ratio $I_{Si}/I_G$ of crystal peaks in Raman spectroscopy between silicon and graphite. Since this value varies depending on various factors such as the specific surface area of the base, the amount of the carbon coating, the crystallinity of the particles of the base, and so on, these physical properties of the coatings to be compared need to be the same.

In the invention, organic substances used as a raw material to generate the organic gas and/or vapor are selected from substances to generate carbon by pyrolysis at the temperatures of the above heat treatment, particularly under a non-oxidizing atmosphere. For example, an atmosphere containing 50 volume % or more of methane may be used; but the invention is not limited to this atmosphere.

More specifically, examples include hydrocarbon such as methane, ethane, ethylene, acetylene, propane, butane, butene, pentane, isobutane, and hexane alone or in combination, an aromatic hydrocarbon of a monocycle to a tricycle such as benzene, toluene, xylene, styrene, ethylbenzene, diphenylmethane, naphthalene, phenol, cresol, nitrobenzene, chlorobenzene, indene, cumarone, pyridine, anthracene, and phenanthrene, or a mixture thereof. In addition, a gas light oil, a creosote oil, an anthracene oil, a naphtha-cracked tar oil, and the like that are obtained by a tar distillation process may be used singly or in combination.

In this case, the coverage of the carbon coating is preferably, but not particularly limited to, in the range from 0.3 to 40 mass %, more preferably in the range from 0.5 to 30 mass %, with respect to the whole particles used for the carbon coating.

When the coverage of the carbon coating is 0.3 mass % or more, the conductive powder can maintain sufficient conductivity and the cycle performance of a negative electrode of a non-aqueous electrolyte secondary battery can reliably be improved. When the coverage of the carbon coating is 40 mass % or less, the following risks can be reduced: the effect is not achieved; the ratio of graphite to the negative electrode material is increased; this material has reduced charging and discharging capacities when used as the negative electrode material of a non-aqueous electrolyte secondary battery.

[Lithium-Ion Secondary Battery]

The inventive lithium-ion secondary battery includes a positive electrode, a negative electrode, and a lithium-ion conducting non-aqueous electrolyte. The inventive negative electrode material for use in a non-aqueous electrolyte secondary battery is used for this negative electrode.

Other materials for the positive electrode, the electrolyte, a separator, and so on, and the battery shape are not limited in particular; known materials may be used.

When a negative electrode is produced with the inventive negative electrode material for use in a non-aqueous electrolyte secondary battery, a conductive additive such as carbon or graphite may be added. The type of the conductive additive is not particularly limited; any electronic conductive material that neither decomposes nor transmutes in a battery produced with this material suffices for the conductive additive.

Specific examples of the conductive additive include powder or fiber of metal such as Al, Ti, Fe, Ni, Cu, Zn, Ag, Sn, and Si, and graphite such as natural graphite, synthetic graphite, various types of coke powder, mesophase carbon, vapor-grown carbon fiber, pitch-based carbon fiber, polyacrylonitrile (PAN) based carbon fiber, and various types of sintered resin.

An example of a method of preparing a negative electrode (a product) is given as follows.

The negative electrode material is mixed with a solvent such as N-methylpyrrolidone or wafer, together with as necessary a conductive additive and other additives such as a binder to form paste-like mixture. This mixture is applied to a sheet current collector.

The current collector may be made of a material typically used for a negative-electrode current collector, such as copper foil or nickel foil, which can be used without any limitation such as its thickness or surface treatment.

The procedure for forming the paste-like mixture into a sheet is not particularly limited; known methods may be used.

A lithium compound, a chalcogen compound, a transition metallic oxide such as $LiCoO_2$, $LiNiO_2$, $LiMn_2O_4$, $V_2O_5$, $MnO_2$, $TIS_2$, and $MoS_2$ may be used as a positive electrode active material.

Examples of the electrolyte include a non-aqueous solution containing lithium salt such as lithium hexafluorophosphate or lithium perchlorate. Examples of the non-aqueous solution include propylene carbonate, ethylene carbonate, diethyl carbonate, dimethoxyethane, γ-butyrolactone, 2-methyltetrahydrofuran, and a mixture thereof. In addition to these solutions, various solid electrolytes and other non-aqueous electrolytes may be used.

EXAMPLES

The present invention will be more specifically described below with reference to examples and comparative examples, but the invention is not limited to these examples.

Example 1

A 30-kg lump of $SiO_x$ (where x=0.94) was pulverized with a jaw crusher and the resultant was sieved with a sieve having 1-mm holes to obtain 22-kg powder passing through the sieve. This 5-kg powder was put into a hopper of a counter-type jet mill (100AFG made by HOSOKAWA MICRON CORPORATION), and pulverized under conditions of a raw material supply of 1 kg/hour, a rotor rotation rate of 15,000 rpm, and a pulverization air pressure of 0.6 MPa. Powder with an average particle diameter of 3.8 µm was collected with a cyclone. The powder was evaluated with FPIA-3000 made by Malvern Instruments Ltd; its roundness was 0.95 on average; the ratio of the number of particles having a roundness of 0.85 or less was 1.1%.

These 100-g particles were put into a carbon tray and this tray was placed in a batch type of furnace. The temperature of the interior of the furnace was increased to 1000° C. while the pressure of the interior of the furnace was reduced with an oil-sealed rotary vacuum pump. When the temperature reached 1000° C., a $CH_4$ gas was introduced at 0.3 NL/min to perform a carbon coating process for eight hours. At this time, the reduced pressure was 800 Pa. After this process, the temperature was decreased. In this way, 106-g black particles were obtained.

The obtained black particles were conductive particles and had an average particle diameter of 5.2 µm and a BET specific surface area of 6.5 $m^2/g$. The mass ratio of carbon coating to the black particles was 5.7 mass %.

<Battery Evaluation>

A battery produced by using the obtained particles as a negative electrode active material was then evaluated as follows.

First, a mixture was produced with 45 mass % of the obtained negative electrode material (the black particles), 45 mass % of synthetic graphite having an average particle size of 10 µm, 10 mass % of polyimide. The mixture was then mixed with N-methylpyrrolidone to form a slurry.

The slurry was applied to 12-µm-thickness copper foil and dried at 80° C. for 1 hour. The resultant foil was pressed with a roller press to form an electrode. The electrode was dried under a vacuum at 350° C. for 1 hour. The electrode was then die-cut into a 2-$cm^2$ negative electrode.

Next, an evaluation lithium-ion secondary battery was produced to evaluate the charging and discharging characteristics of the obtained negative electrode; the production of this secondary battery used a lithium foil positive electrode, non-aqueous electrolyte composed of a mixed solution having an ethylene carbonate-to-diethyl carbonate volume ratio of 1:1 and 1 mole/L of lithium hexafluorophosphate dissolved in the solution, a 30-µm-thickness separator made of a polyethylene microporous film.

The produced lithium-ion secondary battery was left at room temperature a night, and then charged and discharged by using a secondary battery charging and discharging tester (made by NAGANO K.K).

The battery was first charged with a constant current of 0.5 $mA/cm^2$ until the voltage of the test cell reached 0 V. After this voltage reached 0 V, the charging was continued while the current was decreased such that the voltage of the test cell kept 0 V. When the current was decreased to less than 40 $µA/cm^2$, the charging was terminated to measure the charging capacity. The battery was then discharged with a constant current of 0.5 $mA/cm^2$. When the voltage reached 1.4 V, the discharging was terminated to measure the discharging capacity.

The first charge and discharge efficiency was calculated from this charging capacity (the first charging capacity) and discharging capacity (the first discharging capacity).

The above charging and discharging test was repeated. After the total number of cycles reached 50, the charging and discharging test of the evaluation lithium-ion secondary battery was carried out. The result is shown in Table 1.

Example 2

A cyclone mill (250W type) made by Shizuoka Plant was used to pulverize 2 kg of the same raw material as in example 1 at an impeller rotation rate of 15,000 rpm. After the pulverization, TC-15 made by NISSHIN ENGINEERING INC., was used for classification, and 1.2 kg of powder was collected with a cyclone. The average particle diameter of this powder was 6.8 µm. Its roundness was 0.97 on average. The ratio of the number of particles having a roundness of 0.85 or less was 0.4%.

These particles were put into a carbon tray, and this tray was placed in a batch type of furnace.

A carbon coating process was performed in the same manner as example 1 except that the time of carbon coating process was nine hours. In this way, conductive particles with a 5.0 mass % carbon coating were obtained.

FIG. 1 shows a picture of base powder in example 2 by a scanning electron microscope (SEM).

A negative electrode was then produced in the same manner as example 1 to evaluate the battery characteristics. The result is shown in Table 1.

Example 3

A 100-kg lump of the same $SiO_x$ (where x=0.94) as in example 1 was pulverized with a jaw crusher and the resultant was put into a VX mill (VX-03 type) made by Kurimoto Ltd., and pulverized under conditions of a table rotation rate of 40 rpm, and a separator rotation rate of 1,600 rpm. The average particle diameter of the pulverized powder was 4.7 µm. Its roundness was 0.91 on average. The ratio of the number of particles having a roundness of 0.85 or less was 31%.

This 100-g powder was fed into Hybridization System, NHS-1, made by NARA MACHINERY Co., Ltd., to perform a treatment for three minutes at 5,000 rpm. The obtained powder was changed such that its weight was 92.5 g, its average particle diameter was 4.4 µm, its roundness was 0.93 on average, and the ratio of the number of particles having a roundness of 0.85 or less was 5%.

A carbon coating process was performed in the same manner as example 1 except that the time of carbon coating process was nine hours. In this way, conductive particles with a 5.0 mass % carbon coating were obtained.

A negative electrode was then produced in the same manner as example 1 to evaluate the battery characteristics. The result is shown in Table 1.

Comparative Example 1

The same raw material as in example 1 weighing 2 kg was put into a tumbling ball mill (15 L) and pulverized at 70 rpm for four hours by using 10-mm-diameter alumina balls as media. The average particle diameter of the pulverized powder was 5.5 µm. Its roundness was 0.86 on average. The ratio of the number of particles having a roundness of 0.85 or less was 92%.

A carbon coating process was performed in the same manner as example 1. In this way, conductive particles with a 5.4 mass % carbon coating were obtained.

Figure 2:
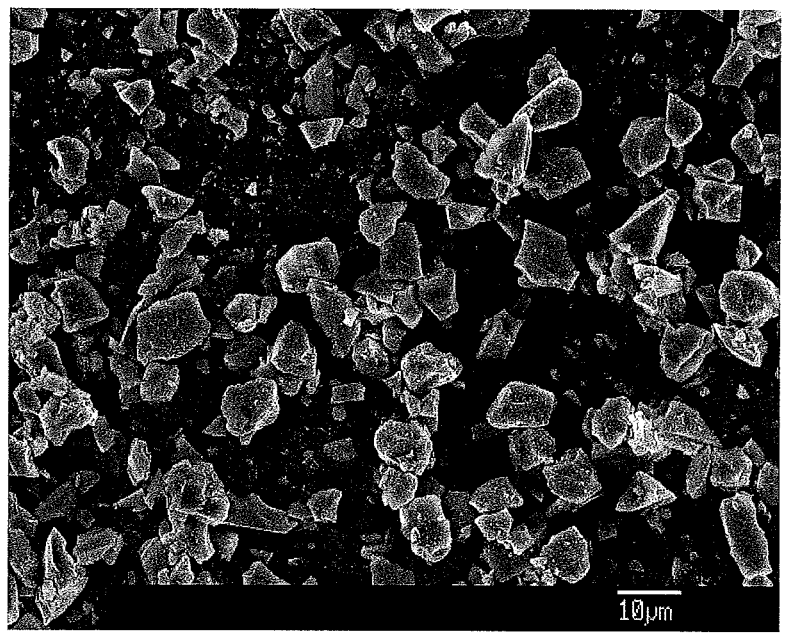
FIG. 2 is a picture of base powder in comparative example 1 by SEM.

FIG. 2 shows a picture of base powder in comparative example 1 by SEM.

A negative electrode was then produced in the same manner as example 1 to evaluate the battery characteristics. The result is shown in Table 1.

Comparative Example 2

The powder pulverized by the VX mill (VX-03 type) made by Kurimoto Ltd., in example 3 was used without any process. The average particle diameter of this powder was 4.7 µm. Its roundness was 0.91 on average. The ratio of the number of particles having a roundness of 0.85 or less was 31%.

A carbon coating process was performed in the same manner as example 1. In this way, conductive particles with a 4.9 mass % carbon coating were obtained.

A negative electrode was then produced in the same manner as example 1 to evaluate the battery characteristics. The result is shown in Table 1.

Comparative Example 3

The same 5-kg powder as example 1 was put into a hopper of a counter-type jet mill (100AFG made by HOSOKAWA MICRON CORPORATION), and pulverized under conditions of a raw material supply of 1.2 kg/hour, a rotor rotation rate of 5,600 rpm, and a pulverization air pressure of 0.6 MPa. Powder with an average particle diameter of 13.8 µm was collected with a cyclone. The powder was evaluated with FPIA-3000 made by Malvern Instruments Ltd; its roundness was 0.92 on average; the ratio of the number of particles having a roundness of 0.85 or less was 10%.

A carbon coating process was performed in the same manner as example 1 except that the time of carbon coating process was ten hours. In this way, conductive particles with a 5.0 mass % carbon coating were obtained.

A negative electrode was then produced in the same manner as example 1 to evaluate the battery characteristics. The result is shown in Table 1.

TABLE 1

| | average roundness | particles with a roundness of 0.85 or less % | first charging capacity mAh/g | first discharging capacity mAh/g | first charge and discharge efficiency % | discharging capacity maintenance rate after 50 cycles % |
|---|---|---|---|---|---|---|
| example 1 | 0.95 | 1.1 | 2220 | 1712 | 77 | 95 |
| example 2 | 0.97 | 0.4 | 2245 | 1729 | 77 | 93 |
| example 3 | 0.93 | 5 | 2236 | 1730 | 77 | 92 |
| comparative example 1 | 0.86 | 92 | 2261 | 1718 | 76 | 81 |
| comparative example 2 | 0.91 | 31 | 2219 | 1711 | 77 | 83 |
| comparative example 3 | 0.92 | 10 | 2221 | 1720 | 77 | 86 |

As shown in Table 1, it was confirmed that the lithium-ion secondary batteries in examples 1 to 3 had high capacity, excellent first charge and discharge efficiency, and excellent cycle performance.

In comparative examples 1 to 3, in contrast, the first charging and discharging capacities and the first charge and discharge efficiency were maintained, but cycle maintenance rates just after the 50 cycles were lower than those in examples 1 to 3.

It was thus confirmed that the negative electrode materials in comparative examples had inferior cycle performance compared with the negative electrode materials in examples.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method of producing a negative electrode material for use in a non-aqueous electrolyte secondary battery, comprising:
    making base powder out of silicon oxide powder expressed by a general formula of $SiO_x$, where $0.5 \leq x \leq 1.6$, as a silicon-contained material capable of occluding and emitting lithium ions;
    measuring a volume average particle diameter of the made base powder by using particle size distribution with laser diffractometry;
    randomly sampling 5000 particles or more from the base powder and measuring roundness of the sampled particles by image analysis of the particles, the roundness being defined by (a perimeter of a circle having the same projected area)/(a perimeter of the particle);

selecting the base powder such that when the volume average particle diameter ranges from 0.5 to 20 μm, the roundness of the sampled particles is 0.93 or more on average, and a ratio of the number of particles having a roundness of 0.85 or less among the sampled particles is 5% or less; and coating a surface of the selected base powder with a carbon coating.

2. The method according to claim 1, further comprising coating a metallic oxide coating on the surface of the selected base powder after selecting the base powder, wherein the carbon coating is coated on a surface of the metallic oxide coating.

3. A negative electrode material for use in a non-aqueous electrolyte secondary battery, comprising:

base powder made of silicon oxide powder expressed by a general formula of $SiO_x$, where $0.5 \leq x \leq 1.6$, as a silicon-contained material capable of occluding and emitting lithium ions; and a carbon coating with which a surface of the base powder is coated, wherein a volume average particle diameter of the base powder that is measured by using particle size distribution with laser diffractometry ranges from 0.5 to 20 μm, roundness of 5000 particles or more that are randomly sampled from the base powder is 0.93 or more on average, the roundness being measured by image analysis of the particles and defined by (a perimeter of a circle having the same projected area)/(a perimeter of the particle), and a ratio of the number of particles having a roundness of 0.85 or less among the sampled particles is 5% or less.

4. The negative electrode material according to claim 3, wherein a metallic oxide coating is coated on the surface of the base powder and the carbon coating is coated on a surface of the metallic oxide coating whereby the carbon coating coats the surface of the base powder.

5. A lithium-ion secondary battery comprising a positive electrode, a negative electrode, and a lithium-ion conducting non-aqueous electrolyte, wherein a negative electrode material for use in a non-aqueous electrolyte secondary battery according to claim 3 is used for the negative electrode.

6. A lithium-ion secondary battery comprising a positive electrode, a negative electrode, and a lithium-ion conducting non-aqueous electrolyte, wherein a negative electrode material for use in a non-aqueous electrolyte secondary battery according to claim 4 is used for the negative electrode.

* * * * *